United States Patent [19]

Speranza et al.

[11] Patent Number: 5,128,441
[45] Date of Patent: Jul. 7, 1992

[54] BLOCK POLYAMIDO CONDENSATION PRODUCTS

[75] Inventors: George P. Speranza, Austin; Jiang-Jen Lin, Houston, both of Tex.

[73] Assignee: Texaco Chemical Company, White Plains, N.Y.

[21] Appl. No.: 519,080

[22] Filed: May 4, 1990

Related U.S. Application Data

[63] Continuation-in-part of Ser. No. 78,308, Sep. 27, 1987.

[51] Int. Cl.$^5$ .................... C08G 69/26; C08G 69/40; C07C 103/24
[52] U.S. Cl. .................... 528/335; 525/420; 528/338; 528/339; 528/340; 528/341; 528/343; 528/347; 528/349; 564/134; 564/139; 564/144; 564/156
[58] Field of Search ............... 528/346, 341, 343, 335, 528/338, 340, 347, 339, 447, 349; 525/420; 564/134, 153

[56] References Cited

U.S. PATENT DOCUMENTS

| Re. 31,522 | 2/1984 | Rieder | 528/341 |
| 4,374,741 | 2/1983 | Rieder | 528/341 |
| 5,053,484 | 10/1991 | Speranza et al. | 528/335 |

*Primary Examiner*—Herbert J. Lilling
*Attorney, Agent, or Firm*—Jack H. Park; Kenneth R. Priem; Carl G. Ries

[57] ABSTRACT

A block polyamido primary amine condensation product prepared by reacting a defined polyoxyalkylene polyamine having terminal primary amine groups with an amount of a defined dicarboxylic acid or an anhydride or a $C_1$ to $C_4$ alkyl ester thereof, sufficient to react one mole of the dicarboxylic acid reactant with each primary amine group of the polyoxyalkylene polyamine to thereby prepare an intermediate condensation reaction product containing terminal carboxyl groups, and reacting one mole of a defined organic di-primary amine with each terminal carboxyl group of the said intermediate condensation reaction product to thereby provide, as the principal product of the reaction a block polyamido primary amine condensation product.

10 Claims, No Drawings

BLOCK POLYAMIDO CONDENSATION PRODUCTS

RELATED APPLICATION

This application is a continuation-in-part of copending Lin and Speranza U.S. Pat. application Ser. No. 07/078,308, filed Sept. 27, 1987 and entitled "POLYAMIDOPOLYAMINES".

BACKGROUND OF THE INVENTION

1. Technical Field of the Invention

This invention relates to block polyamidopolyamine condensation products prepared by reacting a polyoxyalkylene diamine or triamine containing terminal primary amine groups (referred to hereafter as a polyoxyalkylene polyamine) with an amount of an aliphatic or an aromatic dicarboxylic acid or an anhydride or an alkyl ester thereof sufficient to react one mole of the dicarboxylic acid reactant with each terminal primary amine group of the polyoxyalkylene polyamine to provide an intermediate condensation product containing terminal carboxyl groups, and reacting one mole of an organic di-primary amine with each terminal carboxyl group of the intermediate reaction product to provide the primary amine-terminated polyamido block condensation products of the present invention.

Still more particularly, this invention relates to novel block polyamido condensation products containing terminal primary amine groups prepared by reacting a polyoxyalkylene polyamine selected from the group consisting of polyoxypropylene diamines, polyoxypropylene/oxyethylene diamines and polyoxypropylene triamines with an amount of an aliphatic or an aromatic dicarboxylic acid or an anhydride or an alkyl ester thereof sufficient to react one mole of the dicarboxylic acid reactant with each terminal primary amine group of the polyoxyalkylene polyamine to provide an intermediate condensation product containing only terminal carboxyl groups and reacting one mole of an aliphatic, alicyclic or aromatic di-primary amine with each terminal carboxyl group of the intermediate condensation product to thereby provide a block polyamido condensation product characterized by the presence of terminal primary amine groups and internal amido groups. The reactions are preferably conducted at a temperature within the range of about 150° to 250° C. for about 0.5 to about 12 hours at atmospheric pressure. Higher or lower pressures may be used, if desired, but there is no particular advantage in so doing.

The block polyamido condensation products of the present invention are liquids or amorphous solids, depending upon the starting materials, and can be used as raw materials for a wide variety of purposes such as, for example, as chain extenders for epoxy resins, curing agents for epoxy resins, as raw materials for the manufacture of polyureas, thickening agents, etc. The products may also be used as raw materials for the preparation of fuel and lubricant additives, for textile and fiber treating agents, for the preparation of adhesives, for use in the manufacture of polyureas, for use in encapsulation and molding applications, etc.

2. Prior Art

It is known, as exemplified by Yeakey U.S. Pat. No. 3,654,370 to prepare polyoxyalkylene polyamines by the reductive amination of a polyoxyalkylene polyol. The reductive amination is conducted catalytically in the presence of hydrogen and ammonia and an appropriate reductive amination catalyst, such as a nickel, copper and chromia catalyst. The polyoxyalkylene polyamines that are prepared in this fashion are stable articles of commerce having a wide variety of uses such as those mentioned above. In particular, they have found utility as curing agents for epoxy resins, as plasticizers, as cross linking agents and binders for textiles, and as intermediates in the preparation of polyureas. In general, polyoxyalkylene polyamines having molecular weights ranging from about 200 to about 5,000 can be prepared by the Yeakey process.

Kwang U.S. Pat. No. 3,257,342 is directed to epoxy resins that are cured with a polyamidodiamine prepared by reacting about two molar equivalents of a polyoxyalkylenediamine with an aliphatic dicarboxylic acid.

Klein U.S. Pat. No. 4,133,803 is directed to the preparation of novel thermoplastic adhesive compositions having melting points between 20° and 180° C. prepared by reacting a polyoxypropylene diamine or triamine with an aliphatic or aromatic dicarboxylic acid, ester or anhydride thereof. In his working examples, Klein used approximately equimolar amounts of carboxylic acid and polyamine. However, he states that the molar ratio of the polyoxypropylene diamine or triamine to the dicarboxylic acid may range from about 0.25:1 to about 4.0:1. The thermoplatic adhesives of Klein are made by reacting the polyoxypropylene diamine or triamine with the dicarboxylic acid at about 175° to about 275° C. for about 1 to 12 hours.

The preparation of thermoplastic adhesives is disclosed in Schulze U.S. Pat. No. 4,119,615. The adhesives are prepared by a two-step process. In the first step, about 1 to 4 moles of oxalic acid is reacted with a polyoxyalkylene diamine or triamine, the preferred ratio being a mole ratio of about 1 to 2 moles of oxalic acid per mole of polyoxyalkylene diamine or triamine. This results in the formation of a so-called liquid prepolymer which is then reacted with an alkylene diamine such as ethylene diamine which contain 2 to 18 carbon atoms to provide the resinous polyoxyamide thermoplastic adhesive composition.

Sharkey U.S. Pat. No. 4,229,567 and Sharkey U.S. Pat. No. 4,282,346 disclose copolyamides prepared from dicarboxylic acids, piperazine and polyoxyalkylene diamines. For example, azelaic acid, adipic acid, piperazine and a polyoxypropylene diamine were used as starting materials in the ratio of 0.7:0.25:0.88:0.2 in an experiment where the azelaic acid and the adipic acid were first reacted with the polyoxypropylene diamine to form a reaction product to which piperazine was added in aqueous solution. The thus-prepared copolyamides are described as thermoplastic adhesives.

Mains et al. U.S. Pat. No. 4,062,819 is directed to polyamide polyblends wherein one component is a high molecular weight thermoplastic polyamide and the other is a minor amount of a polyamide derived from a high molecular weight dibasic acid. The second component is prepared by reacting a dicarboxylic acid such as "dimer acids" with an aliphatic polyalkylene diamine such as ethylene diamine.

Rasmussen U.S. Pat. No. 4,218,351 discloses impact resistant thermoplastic polyamides which are suitable for use as hot melt adhesives and which contain, as a component, a minor amount of an amorphous amide-forming oligomer which is described as a polyoxyalkylene diamine having a number average molecular weight in the range of about 900 to about 5000.

Mitchell et al. U.S. Pat. No. 4,062,820 discloses copolyamides derived from a mixture of a polymeric fatty acid and a short chain dibasic acid with a mixture of amines composed of a polyoxyalkylene diamine and a short chain diamine such as ethylenediamine.

Rieder U.S. Pat. No. 4,239,635 is directed to aqueous metal working fluids containing a carboxylic acid group terminated polyoxyalkylene diamide or an alkali metal, ammonium or organic amine salt of the diamide. The diamide is prepared by reacting a dicarboxylic acid with a polyoxyalkylenediamine in a 2:1 mole ratio.

Chang U.S. Pat. No. 4,588,783 relates to heat curable compositions containing polyhydroxyethyl carbonates which are prepared by reacting an amidoamine with an organic carbonate. The amidoamines are prepared by reacting a polyester with an equivalent excess of a polyamine, for example, by reacting two moles of isophorone diamine with one mole of dimethylcyclohexane dicarboxylate.

Bentley et al. U.S. Pat. No. 4,751,255 is directed to polymeric polyamines prepared by reacting a polycarboxylic acid or an ester thereof with a stoichiometric excess of a polyamine having terminal aminopropoxy groups to provide polymeric polyamines containing 2 to 4 primary amine groups per molecule.

BACKGROUND OF THE PRESENT INVENTION

The polyoxyalkylene polyamines of the type disclosed in Yeakey U.S. Pat. No. 3,654,370 are prepared by the reductive amination of polyols made by the oxyalkylation of a polyhydric alcohol. The preferred starting materials are dihydric and trihydric alcohols such as propylene glycol or glycerol and propylene oxide or ethylene oxide. Copolymer polyols of ethylene oxide and propylene oxide are also useful.

The molecular weight of the polyol is determined by the number of moles of epoxide that are reacted with the alcohol initiator. Since the addition is random, the final alkoxylation product will not be a pure compound but, rather, will be a mixture of polyoxyalkylene polyols. For example, if the polyol is a polyol prepared by reacting glycerol or trimethylol propane with propylene oxide, using an amount of propylene oxide adequate to provide for an average molecular weight of about 1,000, the final propoxylation product will actually be composed of a mixture of polyoxypropylene triols having molecular weights varying from about 800 to about 1,200, the molecular weight distribution following a Gaussian distribution curve (sometimes referred to as a sine curve or a Poissan curve). As the molecular weight of the polyol increases, the spread in the molecular weights will also increase. Thus, when the average molecular weight of the triol is about 3,000, the deviation will be about ±400 molecular weight units so that most of the product will fall within the molecular weight range of about 2,600 to about 3,400.

As the molecular weight is still further increased, the percentage of free hydroxyl groups in the reaction mixture will decrease because of the added bulk of the already formed polyol, thus making the addition of more propylene oxide groups progressively more difficult. As a practical matter, when the triol reaches an average molecular weight of about 5,000, further propoxylation is accomplished only with extreme difficulty. The 5,000 molecular weight polyoxypropylene triols will have a molecular weight distribution of about ±1,000 so that the actual molecular weight range will be from about 4,000 to about 6,000. Again, the molecular weight distribution following a Gaussian distribution curve.

A further complication is encountered during the propoxylation to the higher molecular weights. As the reaction time and temperature are increased to encourage propoxylation, there is introduced a tendency on the part of the propylene oxide to isomerize to allyl alcohol and a tendency on the part of the hydroxypropyl end groups of the polyoxypropylene triol to dehydrate to form a terminal olefin group and water. Both the water and the allyl alcohol are susceptible to oxyalkylation thereby diluting the polyoxypropylene diol with undesired generally low molecular weight diol contaminants derived from the water and monofunctional allyl alcohol propoxylates. From as little as one percent to as much as ten percent of the oxypropyl end groups of the triol may dehydrate to form groups with terminal unsaturation in increasing the average molecular weight from about 3,000 to about 5,000.

When a polyoxypropylene polyol of this nature is reductively aminated in accordance with the procedure of Yeakey U.S. Pat. No. 3,654,370, comparatively higher temperatures and longer reaction times are required as the molecular weight of the polyol increases. This can result in the cleavage of the polyol to form undesired and unwanted alkyl ether by-products and hydrogenation of the unsaturated groups on the polyol to form propyl ethers.

Thus, although the results obtained heretofore with polyoxyalkylene diamines and triamines of the type disclosed by Yeakey have been generally satisfactory, problems such as those mentioned above have detracted from the utility of the products.

SUMMARY OF THE INVENTION

In accordance with the present invention, molecular weight distribution and terminal unsaturation problems such as those mentioned above are significantly reduced through the provision of block polyamido condensation products containing terminal primary amine groups that are analogous in function and reactivity to the polyoxyalkylene polyamines of Yeakey.

Another significant property of the block polyamido diamine and triamine condensation products of the present invention, as compared with the corresponding polyoxyalkylene polyamines of Yeakey, is the desirable increase in "stiffness" or "hardness" that is obtained without otherwise adversely affecting the other properties of the amidoamines. For example, when the higher molecular weight polyoxyalkylene polyamines of Yeakey are used to cure epoxy resins, the resultant cured epoxy resin will frequently exhibit undesirable flex and impact properties and other related properties attributable to the "rubbery" nature of the high molecular weight polyoxyalkylene polyamines of Yeakey. Thus, it is frequently necessary to use additives and/or fillers to provide a final cured epoxy resin having the desired physical properties. The block polyamido diamine and triamine condensation products of the present invention being significantly stiffer can be used successfully with lesser quantities of fillers and/or additives or even without additives. The addition of amide groups adds phase mixing advantages (when used as epoxy curing agents) over conventional polyoxyalkylene polyamines in many situations.

DETAILED DESCRIPTION

The block polyamido diamine and triamine condensation products of the present invention will have molecular weights ranging from about 400 to about 8,000 and are prepared by the steps of:

a. reacting a polyoxyalkylene diamine or triamine having terminal primary amine groups with an amount of a dicarboxylic acid or an anhydride or a $C_1$ to $C_4$ alkyl ester thereof, sufficient to react one mole of the dicarboxylic acid reactant with each terminal primary amine group of the polyoxyalkylene diamine or triamine to thereby prepare an intermediate condensation product having terminal carboxyl groups, and b. reacting the intermediate condensation product with an amount of the di-primary amine such that one mole of the di-primary amine reacts with each of the terminal carboxyl groups of the intermediate reaction product, to thereby form the block polyamido diamine or triamine condensation products of the present invention; such condensation products being characterized by the presence of terminal primary amine groups, the substantial absence of terminal carboxyl groups, and the presence of internal amido groups.

The condensation reaction between the polyoxyalkylene polyamine and the carboxylic acid, ester or anhydride thereof, is preferably conducted in an autoclave at a temperature of from about 150° to about 250° C. The reaction time required for completion of the reaction will normally range from about 0.5 to about 12 hours. By-product water of reaction is preferably removed as formed, so that the condensation reaction product obtained at the end of the reaction is the desired product. A slight excess of the dicarboxylic acid is preferably used, such as an excess of about 0.05 to about 0.2 mole, so that about 1.05 to about 1.2 moles of the dicarboxylic acid are added to the reaction vessel for each primary amine group of the polyoxyalkylene diamine or triamine. This will insure that the carboxylic acid, ester or anhydride thereof will be joined to the polyamine through an amide linkage to thereby provide an intermediate condensation reaction product that is substantially completely free from terminal primary amine groups and that is characterized by the presence of terminal carboxylic acid, anhydride or ester groups. The reaction is preferably conducted at atmospheric pressure. Higher or lower pressures, such as pressures ranging from about 40 mm of mercury to about 3,000 psig may be used if desired, but there is no particular advantage is so doing.

The thus-prepared intermediate condensation product is then reacted under essentially the same conditions outlined above with an aliphatic, alicyclic or aromatic di-primary amine, the di-primary amine being used in an amount such that one mole of the di-primary amine reacts with each of the terminal carboxyl groups of the intermediate reaction product, to thereby form the block polyamido diamine or triamine condensation reaction products of the present invention; such condensation products being characterized by the presence of terminal primary amine groups, the substantial absence of terminal carboxyl groups, and the presence of internal amido groups.

The Dicarboxylic Acid Starting Material

The dicarboxylic acid starting material for the present invention may be any suitable aliphatic or aromatic dicarboxylic acid or an anhydride or a lower alkyl ester thereof wherein the alkyl group contains from about 1 to 4 carbon atoms and, more preferably, is methyl; such dicarboxylic acid containing from about 5 to about 44 carbon atoms, having an average molecular weight of 132 to about 800 and having the formula:

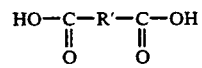

wherein R' represents an aliphatic or an aromatic group containing 3 to 42 carbon atoms and having an average molecular weight of 42 to about 700.

Examples of suitable aliphatic dicarboxylic acids that may be used include adipic acid, dodecanedioic acid, glutaric acid, (molecular weight =132) azelaic acid, sebacic acid, the so-called "dimer acids" prepared by the dimerization of unsaturated monocarboxylic acids such as oleic acid, linoleic acid, eleostearic acid, and mixtures thereof which are sold commercially as "tall oil fatty acids".

The dimer acids are conventionally prepared by the thermal polymerizaton (with or without a catalyst) of saturated, ethylenically unsaturated, or acetylenically unsaturated monocarboxylic acids containing 8 to 24 carbon atoms with monocarboxylic acids having 16 to 20 carbon atoms being preferred. Thus, the dimer acids will normally contain from about 24 to 44 carbon atoms. It can be calculated that the butyl ester of a dimer acid containing 44 carbon atoms will have a molecular weight of about 800. Dimer acids are, for the most part, a variety of substituted cyclohexenedicarboxylic acids from by a Diels-Alder reaction.

A particularly useful discussion of the type of polymer fatty acids employed herein is contained in "The Dimer Acids," E. Leonard editor, published by the Humko Sheffield Chemical Company in Connecticut.

Other suitable dicarboxylic acids that may be used include brasslic acid, octadecanedioic acid, thapsic acid and dodecanedioic acid.

Examples of aromatic dicarboxylic acid that may be used as starting materials for the present invention include acids such as terephthalic acid, isophthalic acid, trimesic b acid, 1,1,3-trimethyl-3-phenylidan-4',5-dicarboxylic acid, 2,6-naphthalene dicarboxylic acid, t-butyl isophthalic acid, etc. (i.e., benzene dicarboxylic acids and tricarboxylic acids, hemimellitic acid, trimellitic acid, 2-phenyl pentanedioic acid, etc.).

The Polyoxyalkylene Polyamine Starting Materials

The polyoxyalkylene polyamine starting materials for the present invention include polyoxypropylene diamines, polyoxypropylene triamines and polyoxyethylene/oxypropylene diamines containing both ethylene oxide and propylene oxide.

One group of appropriate polyoxypropylene diamines that can be used are those that are sold by the Texaco Chemical Company as Jeffamine ® D-series products having the formula:

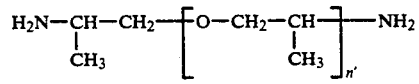

Wherein n' is a number having an average value of about 1 to about 50.

Representative products include a polyoxypropylene diamine having an average molecular weight of about 230 wherein the value of n' is 2.6 (Jeffamine ® D-230 amine), a polyoxypropylene diamine having an average molecular weight of about 400 wherein n' has a value of 5.6 (Jeffamine ® D-400 amine), a polyoxypropylene diamine product having an average molecular weight of about 2,000 wherein n' has a value of about 33 (Jeffamine ® D-2000 amine) and a product having an average molecular weight of about 4,000 wherein n has a value of about 60 (JeffamineR D-4005 amine).

It is necessary to express "n" as an average number because, as pointed out above, the addition of ethylene oxide and/or propylene oxide proceeds randomly, and the addition will conform to a Gaussian distribution curve.

For example, if 1 mole of propylene glycol is reacted with 4 moles of ethylene oxide, under ethyoxylaton reaction conditions, the reaction, in theory, will proceed as follows:

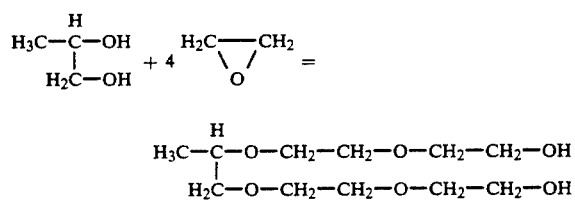

In this situation, R will equal

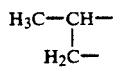

Since the addition of the ethylene oxide proceeds randomly, in conformance with a Gaussian distribution curve, in this example, some of the alkoxylation molecules will contain more than 4 moles of ethylene oxide and some will contain less than 4 moles of ethylene oxide.

The polyol formed by the ethoxylation and/or propoxylation of the divalent or trivalent aliphatic alcohol is reductively aminated, as explained above, to provide the polyoxyethylene/oxypropylene or polyoxypropylene diamine or triamine starting materials of the present invention.

An advantage is obtained when using lower molecular weight diamine and triamine starting materials such as those having average molecular weights of about 200 to about 3,000 in that the final condensation products will have primary amine functionalities and higher molecular weights but will contain significantly fewer contaminants of the type formed by the oxypropylation of dihydric and trihydric alcohols with propylene oxide to form polyoxypropylene diols and triols which, when aminated, will have molecular weights of 3,000 to 6,000.

Another appropriate class of polyoxyalkylene diamines that may be used are diamines containing both ethylene oxide and propylene oxide that are sold by the Texaco Chemical Company as Jeffamine ® ED-series products having the formula:

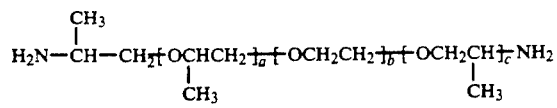

wherein a+c equals a positive number having a value of from about 2 to about 10 and b is a positive number having a value of from about 1 to about 50.

Examples of products having this general formula include a commercial product having an average molecular weight of about 600 where the value of b is about 8.5 and the value of a+c is about 2.5 (Jeffamine ® ED-600), a commercial product having an average molecular weight of about 900 wherein the value of a+c is again about 2.5, but the value of b is about 15.5 (Jeffamine ® ED-900). Other examples are those wherein a+c has a value of about 2.5 including a product having an average molecular weight of about 2,000 wherein the value of b is about 40 (Jeffamine ® ED-2001) and a product having an average molecular weight of about 4,000 wherein the value of b is about 85 (Jeffamine ® ED-4000).

An example of appropriate polyoxypropylene triamines that may be used as a starting material for the present invention include triamines sold by Texaco Chemical Company as Jeffamine ® T-series products having the formula:

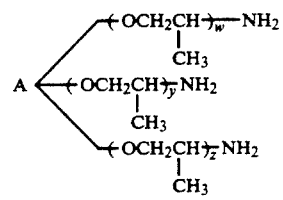

wherein A represents a trivalent hydrocarbon group consisting of 3 to 6 carbon atoms, resulting from the propoxylation of a propoxylation susceptible aliphatic trihydric alcohol containing 3 to 6 carbon atoms, w, y, and z are positive numbers and the average value of the sum of w+y+z is from about 4 to about 100.

Examples of such products include a commercial product having an average molecular weight of about 400 sold by the Texaco Chemical Company under the tradename Jeffamine ® T-403 wherein A represents a trimethylol propane nucleus, and the product contains an average of about 5.3 oxypropylene groups, a product having an average molecular weight of about 3,000 sold by the Texaco Chemical Company under the tradename Jeffamine ® T-3000 wherein A represents a trimethyol propane nucleus and the product contains about 50 oxypropylene groups and a product having an average molecular weight of about 5,000 sold by the Texaco Chemical Company under the tradename Jeffamine ® T-5000 wherein A represents a gylcerol nucleus and the product contains about 86 oxypropylene groups.

For example, Jeffamine ® T-403 and JeffamineR T-3000 will have the formula:

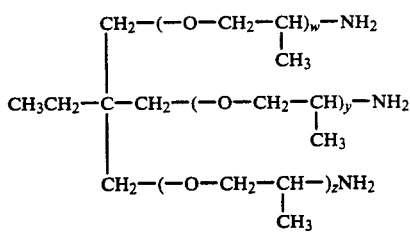

wherein, for Jeffamine ® T-403, the sum of w+y+z will be about 5.3 and for Jeffamine ® T-3000, the sum of w+y+z will be about 50. The addition of propylene oxide is random; the molecules of the propoxylation product follow a Gaussian distribution pattern. A molecule wherein w and y equal 1 and z equals 98 will not be formed.

It is to be observed that in the above-written formula for Jeffamine ® T-403 and Jeffamine ® T-3000, the 6 carbon atom trivalent hydrocarbon group resulting from the propoxylation of trimethylolpropane will be:

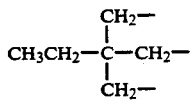

Preparation of the Intermediate Condensation Product

In accordance with the present invention, an intermediate condensation product is prepared by the reaction of a polyoxyalklyene polyamine containing terminal primary amine groups with an aromatic or aliphatic dicarboxylic acid or an anhydride or a $C_1$ to $C_4$ alkyl ester thereof in an amount sufficient provide for the reaction of one mole of the dicarboxylic acid reactant with each terminal primary amine group of the polyoxyalkylene polyamine so as to provide an intermediate condensation product containing only terminal carboxyl groups. The reaction is suitably conducted non-catalytically at a temperature within the range of about 150° to about 250° C. for a reaction time within the range of about 0.5 to 12 hours. Normally, the reaction will go to completion after a reaction time within the range of 2 to about 6 hours.

By-product water of reaction is preferably removed from the reaction mixture as it is formed. The reaction is complete when essentially all of the amine groups of the polyoxyalkylene polyamine have reacted with carboxyl groups of the dicarboxylic acid reactant. Under the noncatalytic conditions employed herein, the polyoxyalkylene polyamine groups are essentially unreactive with each other.

The intermediate condensation products that are formed in accordance with the present invention are liquid or amorphous solids containing terminal carboxylic acid or ester groups.

The Di-Primary Amine Reactant

In accordance with the present invention, the intermediate condensation product is reacted with a di-primary amine which may suitably be an aliphatic, alicyclic or an aromatic diamine.

Such di-primary amines may be represented generally by the formula:

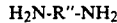

wherein R" represents an aliphatic, alicyclic or aromatic group having an average molecular weight of 28 to about 600 and containing from 2 to about 28 carbon atoms.

More particularly, the organic di-primary amine may be an organic di-primary amine selected from the group consisting of polyoxyethylenediamines, aliphatic di-primary amines wherein the aliphatic group contains 4 to 12 carbon atoms, phenyl diamines, isophorone diamine, 1,2-diaminocyclohexamine diamine and dipropylene-triamine.

The polyoxyethylenediamines to be used in accordance with the present invention have the formula:

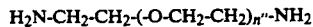

wherein n" is a positive number having a value of 1 to about 4. Representative compounds include bis-aminoethyl ether (where n" is equal to 1), triethylene glycol diamine (where n" is equal to 2) and tetraethylene glycol diamine (where n" is equal to 3).

Representative aliphatic diamines include 1,4-diaminobutane, 1,5-diaminopentane, 1,6-hexanediamine, 1,7-diaminoheptane, 1,8-diaminooctabe, 1,10-decanediamine, 1,12-dodecanediamine, etc.

Phenyl diamines that may be used include 2,4 toluenediamine, 2,6-toluenediamine, diethyltoluene diamine, 4,5-di-methyl-o-phenylenediamine, 2,3,5,6-tetramethyl-p-phenylenediamine, etc.

Preparation of the Polyamido Di- and Tri-Primary Amine Condensation Products In accordance with the present invention, the intermediate condensation product is reacted with an amount of a di-primary amine sufficient for each carboxyl group of the intermediate condensation product to react with one mole of the di-primary amine to provide the polyamido block terpolymer di- or tri-primary amine addition product of the present invention.

The reaction between the intermediate condensation product and the di-primary amine is preferably conducted in an autoclave at a temperature of from about 150° to about 250° C. The reaction time required for completion of the reaction will normally range from about 0.5 to about 12 hours. By-product water of reaction is preferably removed as formed, so that the condensation product obtained at the end of the reaction is the desired final condensation product. A slight excess of the di-primary amine is preferably used, such as an excess of about 0.05 to about 0.2 mole, so that about 1.05 to about 1.2 moles of the di-primary amine are added to the reaction vessel for each carboxyl group of the intermediate condensation product. This will insure that each of the carboxyl groups of the intermediate condensation product will be joined to the di-primary amine through an amide linkage to thereby provide the block polyamido di-primary or tri-primary amine condensation products of the present invention, such condensation products being substantially completely free from terminal carboxyl groups and characterized by the presence of terminal primary amine groups. The reaction is preferably conducted at atmospheric pressure. Higher or lower pressures, such as pressures ranging from about 40 mm of mercury to about 3,000 psig may be used if desired, but there is no particular advantage is so doing.

The block polyamido di-primary or tri-primary amine condensation products prepared in the above described manner are liquid or amorphous solid materials and have a molecular weight within the range of about 400 to about 8,000.

The polyamido block di- or tri-primary amine condensation products of the present invention have the formula:

wherein A" represents the polyoxyalkylene grouping of the polyoxyalkylene polyamine, R' is an aliphatic or an aromatic group containing 3 to 42 carbon atoms and having an average molecular weight of 42 to about 600, A' represents the organic amine group resulting from the condensation of the intermediate condensation product with the organic diprimay amine, and m is a positive number having a value of 1 or 2.

Thus, in general, A' will represent a group having the formula:

-R"-NH$_2$ wherein R" represents an aliphatic, alicyclic or aromatic group having an average molecular weight of 28 to about 600 and containing from 2 to about 28 carbon atoms.

When the organic diprimary amine is a polyoxyethylene diamine, A' will represent:

-CH$_2$-CH$_2$-(O-CH$_2$-CH$_2$)$_{n''}$-NH$_2$ wherein n" is a positive number having an average value of 1 to about 4.

When the di-primary amine is an aliphatic diamine such as 1,4-diaminobutane, A' will represent:

-CH$_2$-CH$_2$-CH$_2$-CH$_2$-NH$_2$

In like fashion, when the di-primary amine is an aromatic amine such as 2,6-toluene diamine, A' will represent:

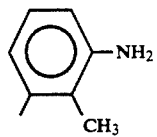

When A' represents a polyoxypropylene triamine, the block polyamido tri-primary amine condensation products of the present invention may be represented by the formula:

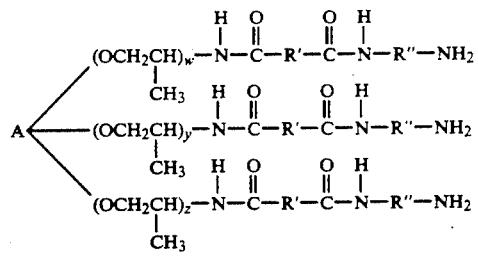

wherein A represents a trivalent hydrocarbon group consisting of 3 to 6 carbon atoms, resulting from the propoxylation of a propoxylation susceptible trihydric alcohol containing from 3 to 6 carbon atoms, w, y, and z are positive numbers and the average value of the sum of w+y+z is from 4 to about 120, R' is an aliphatic or an aromatic group containing 3 to 42 carbon atoms and having an average molecular weight of 28 to about 600 wherein R" represents an aliphatic, alicyclic or aromatic group having an average molecular weight of 28 to about 600 and contains from 2 to and contains from 2 to about 26 carbon atoms and is derived from a polyoxyethylenediamine, an aliphatic di-primary amine containing 4 to 12 carbon atoms, a phenyl diamine, isophorone diamine, 1,2-diaminocyclohexamine, or dipropylenetriamine.

SPECIFIC EXAMPLES

Example 1 (6152-29)

To a 500 ml 3-necked flask equipped with a thermometer, addition funnel, Dean-Stark trap, stirrer and a nitrogen line was charged with JEFFAMINE® D-4000 (300 g, 0.075 mole) and adipic acid (21.9 g, 0.15 mole). The mixture was heated to 200° C. for two hours. An aliquot of sample (15 g) was taken and analyzed to monitor the completion of amide formation by amine titration. Then tetraethylene glycol diamine (EDR-192) (27 g, 0.14 mole) was added and maintained at 200° C. for an additional two hours. After cooling to room temperature, an opaque attractive, lightly colored solid was recovered (324.9 g). The product was soluble in methanol, but insoluble in water or acetone. The amine analysis indicated 0.39 meq/g (theoretical 0.40 meq/g) and acidity was 0.02 meq/g. The IR spectrum showed the evidence of amide formation.

The example illustrates a two-step, one-pot synthesis of an amidoamine with an EDR-series amine as the terminal amine.

Other examples and product properties are cited in the following Table I.

TABLE I

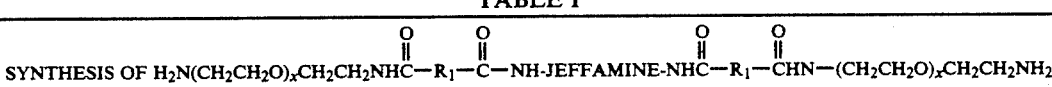

SYNTHESIS OF H$_2$N(CH$_2$CH$_2$O)$_x$CH$_2$CH$_2$NHC—R$_1$—C—NH-JEFFAMINE-NHC—R$_1$—CHN—(CH$_2$CH$_2$O)$_x$CH$_2$CH$_2$NH$_2$

| Notebook No. | Starting Materials | Properties | —NH$_2$ meq/g | —COOH meq/g | IR (Amide) |
|---|---|---|---|---|---|
| 6103-97 | D-4000[1]<br>Adipic Acid<br>EDR-148[3] | Solid, opaque brown, insol. in H$_2$O, sol. in MeOH, acetone; mp 100° C. | 0.26<br>(0.45)* | — | Yes |
| 6152-29 | D-4000<br>Adipic acid | Solid, opaque tan, insol. in H$_2$O, | 0.39<br>(0.40)* | 0.02 | Yes |

TABLE I-continued

SYNTHESIS OF $H_2N(CH_2CH_2O)_xCH_2CH_2NHC(=O)-R_1-C(=O)-NH\text{-JEFFAMINE-NHC}(=O)-R_1-C(=O)N-(CH_2CH_2O)_xCH_2CH_2NH_2$

| Notebook No. | Starting Materials | Properties | ←—Analysis—→ | | IR (Amide) |
| | | | —$NH_2$ meq/g | —COOH meq/g | |
|---|---|---|---|---|---|
| | EDR-192[4] | sol. in MeOH, acetone; mp 35° C. | | | |
| 6103-96 | D-2000[2] Adipic acid EDR-192 | Solid, opaque tan, insol. in $H_2O$, sol. in MeOH, acetone; mp 40° C. | 0.60 (0.73)* | — | Yes |
| 6103-94 | D-2000 Adipic acid EDR-148 | Solid, opaque light brown, insol. in $H_2O$, sol. in MeOH & acetone; mp 100° C. | 0.74 (0.76)* | — | Yes |
| 6152-34 | D-2000 Terephthalic acid EDR-192 | No product due to solw reaction (two-phase reaction) | | | |
| 6152-31 | D-2000 Dimer acid BAEE[5] | Liquid, highly viscous, clear yellow, insol. in $H_2O$, sol. in acetone | 0.74 (0.59)* | 0.01 | Yes |
| 6152-30 | D-2000 Dimer acid EDR-148 | Liquid, viscous clear yellow, insol. in $H_2O$, sol. in acetone | 0.73 (0.58)* | 0.01 | Yes |
| 6152-33 | D-2000 Dimer acid EDR-192 | Liquid, transparent, light yellow, insol. in $H_2O$, sol. in acetone | 0.47 (0.55)* | 0.02 | Yes |
| 6103-98 | ED-600[6] Adipic acid EDR-148 | Soft solid, opaque, pearlescent, sol. in $H_2O$ and MeOH | 1.69 (1.68)* | — | Yes |
| 6103-91 | ED-600 Terephthalic acid EDR-148 | Solid, cream-colored, insoluble in $H_2O$, MeOH, acetone, or MeOAc; mp ca. 190° C. | | | Yes |

*Theoretical
[1]Jeffamine ® D-4000 amine.
[2]Jeffamine ® D-2000 amine.
[3]Triethylene glycol diamine.
[4]Tetraethylene glycol diamine.
[5]Bis aminoethyl ether ($NH_2CH_2CH_2OCH_2CH_2NH_2$).
[6]Jeffamine ® ED-600 amine.

Example 2 (6153-24)

Preparation of JEFFAMINE ® D-2000-Adipic Acid Adduct

To a 3-liter flask equipped with thermometer, stirrer, Dean-Stark trap and nitrogen line wash charged JEFFAMINE ® D-2000 (2000 g, 1 M) and adipic acid (292 g, 2 M). The mixture was heated to 200° C. for three hours. During the process, 34 ml. of water was removed through a Dean-Stark trap. The system was cooled to room temperature and an orange colored liquid (2241 g) was obtained. The analysis indicated acidity 0.93 meq/g (calc. 0.89) and amine 0.01 meq/g.

Example 3 (6153-55)

D-2000-Adipic Acid-Toluene Diamine (1:2:4)

To a 500 ml 3-necked flask equipped with thermometer, stirrer, Dean-Stark trap and nitrogen pad was charged JEFFAMINE ® D-2000 adipic acid adduct (226 g, from 6153-24) and 2,4-toluenediamine (48.8g, 0.4 mole). The mixture was heated to 220° C. for over 4 hours. After cooling, a dark liquid material was recovered (270.1 g). The analysis showed:

Amine 2.15 meq/g (calc. 2.22 meq/g)
Acidity 0.05 meq/g
Water 0.03%

Example 4 (6153-27)

D-2000-Adipic Acid-DETDA (1:2:2 Molar Ratio)

To a 500 ml 3-necked flask equipped with thermometer, stirrer, Dean-Stark trap was charged the adduct of JEFFAMINE ® D-2000-adipic acid (225.6 g) and DETDA (diethyltoluenediamine, 35.6 g). The mixture was heated to 220°-210° C. for over 4 hours and cooled to room temperature. A viscous brown liquid was recovered (247.0 g). The analysis indicated amine 0.87 meq/g (calc. 0.76) and acidity 0.50 meq/g. Other examples are summarized in the attached table.

Example 5 (6153-27A)

A soap dish was made by mixing amine (prepared from JEFFAMINE ® D-2000-adipic acid-DETDA, 6153-27), 32.7 g, dipropyltriamine, 6.6 g, and Epon 828 (from Shell) 56.1 g. The well mixed material was poured into a plastic mold and cured at 70° C. for overnight. The experiment demonstrated the usage of one amine in epoxy resin material application.

TABLE II

AROMATIC AMINE TERMINATED JEFFAMINE ®-AMIDES

| D-400 | D-2000 | D-4000 |
|---|---|---|
| 6153-30 | 6153-27 | 6153-32 |
| 1:2:2* | 1:2:2* | 1:2:2* |
| Brown solid | Dark liquid | Dark liquid |
| Amine 1.85 meq/g | Amine 0.87 meq/g | Amine 0.68 meq/g |
| Acid 0.60 meq/g | Acid 0.50 meq/g | Acid 0.29 meq/g |
| 6153-29 | 6153-26 | 6253-25 |
| 1:2:4* | 1:2:4* | 1:2:4* |
| Brown solid | Brown liquid | Brown liquid |
| Amine 4.53 meq/g | Amine 2.28 meq/g | Amine 1.47 meq/g |
| Acid 0.33 meq/g | Acid 0.28 meq/g | Acid 0.30 meq/g |
| — | 6153-55 | — |
|  | 1:2:4 TDA* |  |
|  | Dark liquid |  |
|  | Amine 2.13 meq/g |  |
|  | Acid 0.05 meq/g |  |
|  | H$_2$O 0.03% |  |

*Molar ratio of JEFFAMINE ® amine:adipic acid:aromatic amine
TDA = toluene diamine

Example 6 (6152-88)

To a 250-ml 3-necked flask equipped with thermometer, stirrer, Dean-Stark trap and nitrogen line was charged D-400-adipic acid adduct (prepared from 6152-83, 65.6 g, 0.1 M) at ca. 110° C. pot temperature, 1,6-hexanediamine (23.2 g, 0.2 M) was added. The mixture was then heated to 204° C. to remove water. The reaction was run for ca. 4 hour period of time and then cooled to room temperature. A solid material form of product was recovered. The analysis showed 2.51 meq/g amine (calc. 2.2 meq/g).

Example 7 (6152-94)

The same procedures were used for the reaction of D-400-adipic acid adduct (65.6 g) and isophorone diamine (34 g). The reactants were heated at 200° C. for about 5 hours to remove water. The recovered product was a light yellow hard, transparent solid, which was soluble in methanol and insoluble in water. The analyses showed 1.85 meq/g amine (calc. 2.08) acidity 0.03 meq/g and water content 0.68%.

Results of other examples are summarized in the attached Table III.

Example 8 (6153-50-1)

Utility of Product

The resulting product from 6153-50 was a viscous light yellow liquid and methanol soluble. This product (69.4 g) was mixed with Epon 828 (Shell; 18.7 g) and cured at 78° C. overnight. A flexible, transparent, yellowish epoxy resin was made. The experiment demonstrated the usage of one amine in epoxy resin material applications.

TABLE III

ALKYL AMINE PRIMARY TERMINATED JEFFAMINE ® AMINE AMIDE

NH$_2$—[cyclohexane]—CH$_2$—NHC(O)—R—C(O)NH—JEFFAMINE—NHC(O)—R—C(O)NH—[cyclohexane]—NH$_2$

|  | Isophorone Diamine | 1,2-Diamino-Cyclohexane | 1,6-Hexane-Diamine |
|---|---|---|---|
| D-400 Adipic Acid | 6152-92 Solid light yellow, transparent, hard Amine 1.85 (2.08) Acid 0.03; Sol. in MeOH; Insol. in H$_2$O | 6153-98 Solid hard, yellow Amine 2.22 (2.66) Acid 0.06 | 6152-88 Solid creamy hard Amine 2.51 meq/g |
| D-2000 Adipic Acid | 6153-50 Liquid yellow viscous Amine 0.72 (0.73) Acid 0.05 | 6153-99 Solid soft, grey-yellow Amine 0.56 (0.56) Acid 0.04 |  |
| D-4000 Adipic Acid | 6153-8 Liquid light yellow hazy Amine 0.25 (0.44) Acid 0.03 | 6199-15 Semisolid yellow hazy Amine 0.54 Acid 0.07 | 6153-20 Solid white, creamy soft hazy Amine 0.25 Acid 0.07 |
| ED-2001 Adipic Acid | 6153-17 Solid white mp ca. 40° C. Amine 0.35 (0.76) Acid 0.08 Soluble in water | 6199-17 Solid grey Amine 1.17 (1.0) Soluble in water | 6153-19 Solid light colored, hard Insol. in water |
| D-400 Dimer Acid | 6199-34 Solid light yellow, transparent, soft Amine 1.11 (1.15) Acid 0.06 | 6199-37 Liquid yellow transparent Amine 1.43 (1.3) Acid 0.06 |  |
| D-2000 Dimer Acid | 6199-35 Semisolid yellow transparent Amine 0.37 (0.68) Acid 0.04 | 6199-20 Liquid yellow transparent Amine 0.55 (0.6) | 6199-23 Solid yellow transparent, soft Amine (0.64) Acid 0.04 |

*Analysis: Amine and acidity in meq/g. Calculated figures in parenthesis;
*DAMP: Example 6199-44.

Example 9 (6153-43)

To a 500 ml flask equipped with a thermometer, mechanical stirrer, Dean-Stark trap and nitrogen line was charged T-5000-adipic acid adduct (by mixing JEFFAMINE T-5000, 289 g and adipic acid 21.9 g. The two reactants were heated at 200°–220° C. to remove water) and diethyltoluene diamine (53.4 g). The contents were further heated at 220° C. for 3 hours and then cooled to room temperature. Analyses of the viscous brown liquid (350 g) indicated 1.58 meq/g amine and 0.34 meq/g acidity.

Example 10 (6199-1A)

Utility of Product 6199-1

Using the same procedure of Example 9, a product of T-2000-dimer acid-DETDA (1:3:3 molar ratio adduct) was prepared, with analyses of 1.19 meq/g amine and 0.40 meq/g acid. A portion of product 6199-1 (4.2 g) was mixed thoroughly with Epon 828 (Shell product, 18.7 g), then poured to a mole and cured at 78° C. overnight. A flexible epoxy resin material was made.

TABLE IV

TRIFUNCTIONAL AROMATIC AMINES FROM JEFFAMINE T-SERIES AMINES

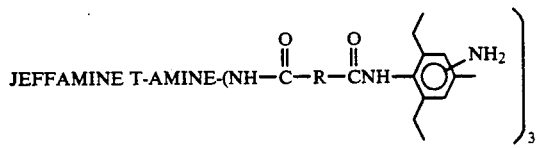

| | R = Adipic Acid | R = C36 Dimer Acid |
|---|---|---|
| T-403 | 6153-83[1] Brown solid<br>NH$_2$: 5.48 meq/g<br>Acid: 0.56 meq/g<br>IR: Amide | 6199-8[1] Semisolid brown<br>NH$_2$: 2.97 meq/g<br>Acid: 0.15 meq/g |
| T-3000 | 6153-62[1]<br>NH$_2$: 2.5 meq/g<br>Acid: 0.49 meq/g<br>IR: Amide | 6199-1[2] Liquid (brown, viscous)<br>NH$_2$: 1.19 meq/g<br>Acid: 0.40 meq/g |
| T-5000 | 6153-43[1] Liquid (brown viscous)<br>NH$_2$: 1.58 meq/g | 6199-2[2] Liquid (orange viscous)<br>NH$_2$ 0.85 meq/g |
| | R = Adipic Acid<br>Acid: 0.34 meq/g | R = C36 Dimer Acid<br>Acid: 0.31 meq/g |

[1] T-amine:diacid:amine (1:3:6 molar ratio)
[2] T-amine:diacid:amine (1:3:3 molar ratio)

Example 11 (6152-83)

Carboxylic Acid Terminated JEFFAMINE® D-Amine

To a 3-liter 3-necked flask equipped with a thermometer, mechanical stirrer, Dean-Stark trap, and nitrogen line was added JEFFAMINE® D-400 (1200 g, 3M) and adipic acid (876 g, 6M). The mixture was heated to 200° C. for about three hours to remove water (ca. 100 ml). The recovered product (1966.6 g) was a grey viscous liquid. The analysis indicated total conversion of amine, 0.01 meq/g for amine and 3.27 meq/g for acidity (3.1 calc.).

Example 12 (6153-66)

DPTA Capped D-400-Adipic Acid Adduct

To a 250-ml 3-necked flask equipped with thermometer, stirrer, Dean-Stark Trap and nitrogen line was charged D-400-adipic acid adduct (6152-83, 65.6 g) and dipropyltriamine (26.2 g). The mixture was heated to 170°–220° C. for over 4 hours and 3.6 cc of water removed. The recovered product was analyzed to be 0.01 meq/g for acidity, 2.06 meq/g for primary amine and 2.11 meq/g for secondary amine.

Example 13 (6199-36-1)

Usage Example

The mixture of 6199-36 (28.5 g) and Epon 828 (18.7 g) was mixed well and poured into a mold and cured at 78° C. overnight. An attractive epoxy resin was made.

TABLE V

| Diacid Precursor | Properties of Products |
|---|---|
| D-400 + adipic acid (1:2) | 6153-66: Semisolid yellow;<br>Primary amine 2.06 meq/g (calc. 2.2); Secondary amine 2.11 meq/g<br>Acidity 0.01 meq/g |
| D-2000 + adipic acid (1:2) | 6153-49: Liquid viscous yellow<br>Primary amine 0.96 meq/g<br>Secondary amine 0.57 meq/g<br>Acidity 0.08 meq/g |
| D-4000 + adipic acid (1:2) | 6153-12: Semisolid (opaque)<br>Primary amine 0.34 meq/g<br>Secondary amine 0.23 meq/g<br>Acidity 0.08 meq/g |
| ED-2001 + adipic acid (1:2) | 6153-18: Solid, light grey,<br>mp 35° C., water-soluble<br>Primary amine 0.80 meq/g<br>Secondary amine 0.59 meq/g<br>Acidity 0.11 meq/g |
| D-400 + C36 dimer acid | 6199-36: Liquid yellow, trans- |

TABLE V-continued

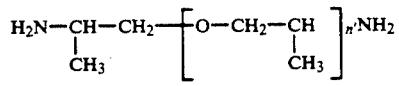

| Diacid Precursor | Properties of Products |
|---|---|
| (1:2) | parent, viscous |
| | Primary amine 1.41 meq/g |
| | Secondary amine 0.71 meq/g |
| | Acidity 0.06 meq/g |
| D-2000 + C36 dimer acid | 6199-19: Liquid yellow, |
| (1:2) | transparent |
| | Primary amine 0.41 meq/g |
| | Secondary amine 0.22 meq/g |

Example 14

A product, 6152-31, prepared from JEFFAMINE® D-2000 amine, dimer acid and bisaminoethyl ether, gave unusual epoxy products.

Plastic Part I. Product 6152-31, 67.6 g (0.05 meq) was mixed with 9.3 g of Epon 828 (0.05 meq, diglycidol ether of bisphenol-A, Shell Chemical Co.). The viscous material was poured into a flexible urethane mold to form a soap dish. The mold was placed in an oven and held overnight at 70° C. A rubbery epoxy part was obtained which was rather tough and elastic even though a deficiency of amine was present.

Plastic Part II. The run above was repeated except that 18.6 g of Epon 828 was used. The molded turtle was transparent and had considerable resiliency.

Plastic Part III. To add toughness to the elastic epoxies obtained as described above, we added a higher crosslinking amine. To the mold was added 33.8 g of 6152-31, 56.1 g of Epon 828 and 6.6 g of dipropylenetriamine. The mixture and mold were heated in an oven at 63° C. overnight. We obtained autogenous phase separation. The shell of the turtle was very hard while the bottom was made of the flexible epoxy. Such one-pour, two-phase objects should have many applications for hard objects requiring a soft support, objects of art, floors, and building supports in earthquake areas.

The foregoing examples have been given by way of illustration only and are not intended as limitations on the scope of this invention, which is defined by the appended claims.

We claim:

1. A block polyamido primary amine condensation product having a number average molecular weight of about 400 to about 8,000 prepared by a process comprising the steps of:

a) reacting a polyoxyalkylene polyamine having terminal primary amine groups with an amount of a dicarboxylic acid or an anhydride or a $C_1$ to $C_4$ alkyl ester thereof, sufficient to react one mole of the dicarboxylic acid reactant with each primary amine group of the polyoxyalkylene polyamine to thereby prepare an intermediate condensation reaction product containing only terminal carboxyl groups, b) reacting one mole of an organic di-primary amine with each terminal carboxyl group of the said intermediate reaction product to thereby provide, as the principal product of the reaction, said block polyamido condensation product having terminal groups consisting essentially of primary amine groups, c) said polyoxyalkylene polyamine being selected from the group consisting of polyoxypropylene diamines, polyoxyethylene/oxypropylene diamines, and polyoxypropylene triamines, d) said polyoxypropylene diamine having the formula:

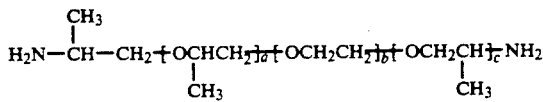

wherein n' a positive number having an average value of 2 to about 100, e) said polyoxyethylene/oxypropylene diamine having the formula:

$$H_2N-CH-CH_2+OCHCH_2+_a+OCH_2CH_2+_b+OCH_2CH+_c NH_2$$
   with $CH_3$ groups wherein a+c equals a positive number having an average value of 2 to about 10 and b is a positive number having an average value of from 1 to about 50, f) said polyoxypropylene triamine having the formula:

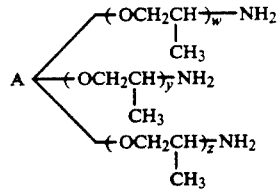

wherein A represents a trivalent hydrocarbon group consisting of 3 to 6 carbon atoms, resulting from the propoxylation of a propoxylation susceptible trihydric alcohol containing from 3 to 6 carbon atoms, and w, y and z are positive integers and the average value of the sum of w+y+z is from 4 to about 120, g) said dicarboxylic acid having the formula:

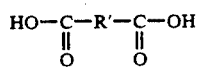

wherein r' is an aliphatic or an aromatic group containing 3 to 42 carbon atoms and having an average molecular weight of 42 to about 600, h) said organic di-primary amines being selected from the group consisting of polyoxyethylenediamines, aliphatic di-primary amines wherein the aliphatic group contains 4 to 12 carbon atoms, phenyl diamines, isophorone diamine, 1,2-diaminocyclohexamine, and dipropylenetriamine, i) said polyoxyethylenediamine having the formula:

$$H_2N\text{-}CH_2\text{-}CH_2\text{-}(O\text{-}CH_2\text{-}CH_2)_{n'''}\text{-}NH_2$$

wherein n" is a positive number having an average value of 1 to about 4.

2. A block polyamido primary amine condensation product having a number average molecular weight of about 400 to about 8,000 prepared by a process comprising the steps of:
   a) reacting a polyoxypropylene diamine having terminal primary amine groups with an amount of a dicarboxylic acid or an anhydride or a $C_1$ to $C_4$ alkyl ester thereof, sufficient to react one mole of the dicarboxylic acid reactant with each primary amine group of the polyoxypropylene diamine to thereby prepare an intermediate condensation reaction product containing only terminal carboxyl groups,
   b) reacting one mole of an organic di-primary amine with each terminal carboxyl group of the said intermediate condensation reaction product to thereby provide, as the principal product of the reaction, said block polyamido condensation product, said polyamido condensation product having terminal groups consisting essentially of primary amine groups, said polyoxypropylene diamine having the formula:

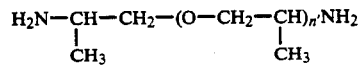

wherein n' is a positive integer having an average value of about 2 to about 100, d) said dicarboxylic acid having the formula:

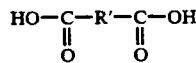

wherein R' is an aliphatic or an aromatic group containing 3 to 42 carbon atoms and having an average molecular weight of 42 to about 600, e) said organic di-primary amine being selected from the group consisting of polyoxyethylenediamines, aliphatic di-primary amines wherein the aliphatic group contains 4 to 12 carbon atoms, phenyl diamines, isophorone diamine, 1,2-diaminocyclohexamine, and dipropylenetriamine, f) said polyoxyethyl;enediamine having the formula:

$$H_2N\text{-}CH_2\text{-}CH_2\text{-}(O\text{-}CH_2\text{-}CH_2)_{n'''}\text{-}NH_2$$

wherein n" is a positive number having an average value of 1 to about 4, g) said block polyamido di-primary amine having the formula:

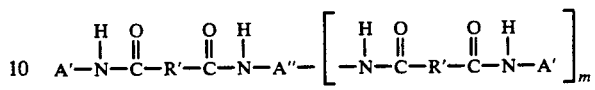

wherein A" represents:

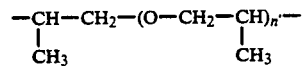

wherein n' and R' have the meaning given above and A' represents a group having the formula:

-R"-NH$_2$ wherein R" represents an aliphatic, alicyclic or aromatic group having an average molecular weight of 28 to about 600 and contains from 2 to about 26 carbon atoms.

3. A block polyamido primary amine condensation product as in claim 2 wherein the dicarboxylic acid is adipic acid and R' represents —(CH$_2$)$_4$—.

4. A block polyamido primary amine condensation product as in claim 3 wherein the organic di-primary amine is a polyoxyethylenediamine having the formula:

$$H_2N\text{-}CH_2\text{-}CH_2\text{-}(O\text{-}CH_2\text{-}CH_2)_{n'''}\text{-}NH_2$$

wherein n" is a positive number having an average value of 1 to about 4 and

A' represents:

-CH$_2$-CH$_2$-(O-CH$_2$-CH$_2$)$_{n'''}$-NH$_2$

5. A block polyamido primary amine condensation product having a number average molecular weight of about 400 to about 8,000, said polyamidodiamine having been prepared by a process comprising the steps of:
   a) reacting a polyoxyethylene/oxypropyl diamine having terminal primary amine groups with an amount of a dicarboxylic acid or an anhydride or a $C_1$ to $C_4$ alkyl ester thereof, sufficient to react one mole of the dicarboxylic acid reactant with each primary amine group of the polyoxyethylene/oxypropylene diamine to thereby prepare an intermediate condensation reaction product containing only terminal carboxyl groups,
   b) reacting one mole of an organic di-primary amine with each terminal carboxyl group of the said intermediate reaction product to thereby provide, as the principal product of the reaction, said block polyamido condensation product, said block polyamido condensation product having terminal groups consisting essentially of primary amine groups,
   c) said polyoxyethylene/oxypropylene diamine having the formula:

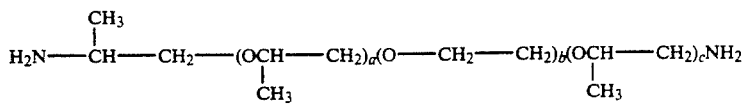

wherein a+c equals a positive number having a value of 2 to about 10 and b is a positive number having a value of from 1 to about 50, d) said dicarboxylic acid having the formula:

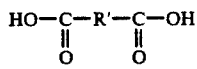

wherein R' is an aliphatic or an aromatic group containing 3 to 42 carbon atoms and having an average molecular weight of 42 to about 600, e) said organic di-primary amine being selected from the group consisting of polyoxyethylenediamines, aliphatic di-primary amines containing 4 to 12 carbon atoms, phenyl diamines, isophorone diamine, 1,2-diaminocyclohexamine, and dipropylenetriamine, f) said polyoxyethylenediamine having the formula:

N$_2$N-CH$_2$-CH$_2$-(O-CH$_2$-CH$_2$)$_{n''}$-NH$_2$ wherein n'' is a positive number having an average value of 1 to about 4, g) said block polyamido di- or tri-primary amine having the formula:

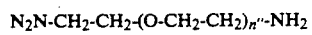

wherein A'' represents:

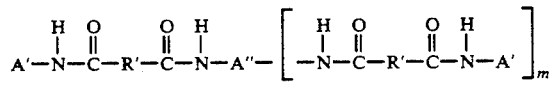

wherein a+c equals a positive number having a value of 2 to about 10 and b is a positive number having a value of from 1 to about 50, and R' has the meaning given above and A' represents a group having the formula:

-R''-NH$_2$ wherein R'' represents an aliphatic, alicyclic or aromatic group having an average molecular weight of 28 to about 600 and contains from 2 to about 26 carbon atoms and is derived from said polyoxyethylenediamine, said aliphatic di-primary amine containing 4 to 12 carbon atoms, said phenyl diamine, said isophorone diamine, said 1,2-diaminocyclohexamine, or said dipropylenetriamine.

6. A block polyamido primary amine as in claim 5 wherein the dicarboxylic acid is adipic acid and R' represents —(CH$_2$)$_4$—.

7. A block polyamido primary amine as in claim 6 wherein the organic di-primary amine is a polyoxyethylenediamine having the formula:

H$_2$N-CH$_2$-CH$_2$-(O-CH$_2$-CH$_2$)$_{n'''}$-NH$_2$ wherein n'' is a positive number having an average value of 1 to about 4 and A' represents:
—CH$_2$—CH$_2$—(O—CH$_2$—CH$_2$)$_{n'''}$—NH$_2$ 8. A block polyamido primary amine condensation product having a number average molecular weight of about 400 to about 8,000 prepared by a process comprising the steps of:

a) reacting a polyoxypropylene triamine having terminal primary amine groups with an amount of a dicarboxylic acid or an anhydride or a C$_1$ to C$_4$ alkyl ester thereof, sufficient to react one mole of the dicarboxylic acid reactant with each primary amine group of the polyoxypropylene triamine to thereby prepare an intermediate condensation reaction product containing only terminal carboxyl groups, and b) reacting one mole of an organic di-primary amine with each terminal carboxyl group of the said intermediate reaction product to thereby provide, as the principal product of the reaction, said block polyamido condensation product, said block polyamido condensation product having terminal groups consisting essentially of primary amine groups, c) said polyoxypropylene triamine having the formula:

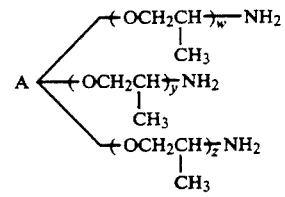

wherein A represents a trivalent hydrocarbon group consisting of 3 to 6 carbon atoms, resulting from the propoxylation of a propoxylation susceptible trihydric alcohol containing from 3 to 6 carbon atoms, and w, y and z are positive integers and the average value of the sum of w+y+z is from 4 to about 120, d) said dicarboxylic acid having the formula:

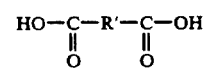

wherein R' is an aliphatic or an aromatic group containing 3 to 42 carbon atoms and having an average molecular weight of 42 to about 600, e) said organic di-primary amine being selected from the group consisting of polyoxyethylenediamines, aliphatic di-primary amines containing 4 to 12 carbon atoms, phenyl diamines, isophorone diamine, 1,2-diaminocyclohexamine, and dipropylenetriamine, f) said polyoxyethylenediamine having the formula:

$$H_2N\text{-}CH_2\text{-}CH_2\text{-}(O\text{-}CH_2\text{-}CH_2)_{n''}\text{-}NH_2$$

wherein n'' is a positive number having an average value of 1 to about 4, g) said block polyamido tri-primary amine having the formula:

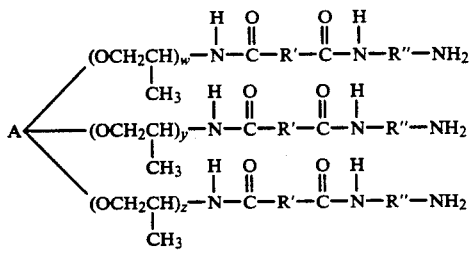

wherein A, w, y, z and R' have the meaning given above and wherein R'' represents an aliphatic, alicyclic or aromatic group having an average molecular weight of 28 to about 600 and contains from 2 to about 26 carbon atoms and is derived from said polyoxyethylenediamine, said aliphatic di-primary amine containing 4 to 12 carbon atoms, said phenyl diamine, said isophorone diamine, said 1,2-diaminocyclohexamine, or said dipropylenetriamine.

9. A block polyamido primary amine as in claim 8 wherein the dicarboxylic acid is adipic acid and R' represents $-(CH_2)_4-$.

10. A block polyamido primary amine as in claim 9 wherein the organic di-primary amine is a polyoxyethylenediamine having the formula:

$$H_2N\text{-}CH_2\text{-}CH_2\text{-}(O\text{-}CH_2\text{-}CH_2)_{n''}\text{-}NH_2$$

wherein n'' is a positive number having an average value of 1 to about 4 and
A' represents:

$$-CH_2\text{-}CH_2\text{-}(O\text{-}CH_2\text{-}CH_2)_{n''}\text{-}NH_2$$

* * * * *